United States Patent
Giering et al.

(10) Patent No.: US 6,481,542 B2
(45) Date of Patent: Nov. 19, 2002

(54) BRAKE ADJUSTER

(75) Inventors: Wilfried Giering, Mendig (DE); Roy Lee Hayford, Redford, MI (US); Neil Williams, Cwmbran (GB); Juergen Dreher, Muelheim-Kaerlich (DE); Christos T. Kyrtsos, Southfield, MI (US); Gerald D. Anderson, Oxford, MI (US); David L. Brademeyer, Centerville, OH (US)

(73) Assignee: Meritor Heavy Vehicle Systems, LLC., Troy, MI (US)

( * ) Notice: Subject to any disclaimer, the term of this patent is extended or adjusted under 35 U.S.C. 154(b) by 0 days.

(21) Appl. No.: 09/788,912

(22) Filed: Feb. 19, 2001

(65) Prior Publication Data

US 2002/0112927 A1 Aug. 22, 2002

(51) Int. Cl.$^7$ .............................................. F16D 65/38

(52) U.S. Cl. ................................ 188/71.7; 188/1.11 R; 188/1.11 W; 188/196 M; 188/70.26

(58) Field of Search ............................. 188/71.7, 71.8, 188/71.9, 1.11 W, 1.11 L, 1.11 R, 196 M, 70.26

(56) References Cited

U.S. PATENT DOCUMENTS

| | | | |
|---|---|---|---|
| 3,365,029 A | 1/1968 | Swift | |
| 3,613,849 A | 10/1971 | Pape | |
| 3,830,343 A | 8/1974 | Gardner | |
| 3,833,102 A | 9/1974 | Stahle | |
| 3,833,103 A | 9/1974 | Stahle | |
| 3,998,295 A | * 12/1976 | Martin | ................... 188/1.11 R |

(List continued on next page.)

OTHER PUBLICATIONS

Newlands Terchnology Ltd, Giant Magnetostrictive Material (GMM), pp. 1–2.

(List continued on next page.)

*Primary Examiner*—Pam Rodriguez
*Assistant Examiner*—C. T. Bartz
(74) *Attorney, Agent, or Firm*—Carlson, Gaskey & Olds

(57) ABSTRACT

A brake adjuster is provided for a vehicle brake such as for heavy duty vehicle. The brake adjuster includes a brake module that produces an electrical signal for adjusting the vehicle brake. The heavy duty vehicle brake typically includes a pair of pistons each having first and second portions that are movable relative to one another. A friction element or brake pad is arranged proximate to the second portion and is movable from a desired position to a worn position as the brake pads wear during operation of the vehicle. In one embodiment of the present invention, the first and second portions are slip fit within a sleeve assembly. At least one adjustment member is arranged between the first and second portions. The adjustment member is constructed from a material which expands in response to an electrical signal, such as a magnetostrictive or a piezoelectric material. The adjustment member moves the second portion relative to the first portion and repositions the brake pads from the worn position to the desired position. In another embodiment, the first and second portions are threaded to one another and movable rotationally relative to one another to adjust the length of the piston. The first portions of the pistons include a plurality of teeth about the outer face. A gear is arranged between the pistons and coupled the teeth of the first portions together. An electric actuator has a driven member that is coupled with at least a portion of one of the pistons teeth to rotate the first and second portions relative to one another to increase the length of the piston and move the brake pad from the worn position to the desired position.

19 Claims, 5 Drawing Sheets

U.S. PATENT DOCUMENTS

| | | |
|---|---|---|
| 4,006,669 A | 2/1977 | Price |
| 4,208,952 A | 6/1980 | Ditlinger |
| 4,378,863 A | 4/1983 | Baum |
| 4,436,186 A | 3/1984 | Ritsema et al. |
| 4,503,950 A | 3/1985 | Anderson |
| 4,611,691 A | 9/1986 | Gornall |
| 4,757,300 A * | 7/1988 | Sebalos .................... 116/204 |
| 4,966,255 A | 10/1990 | Fossum |
| 5,186,286 A | 2/1993 | Lindberg |
| 5,368,138 A | 11/1994 | Kuivamaki |
| 5,415,253 A | 5/1995 | Kuivamaki |
| 5,433,297 A | 7/1995 | Kuivamaki |
| 5,819,884 A * | 10/1998 | Giering .................... 188/71.9 |
| 5,944,151 A * | 8/1999 | Jakobs et al. ............ 188/267.1 |
| 5,957,246 A | 9/1999 | Suzuki |
| 6,000,507 A | 12/1999 | Bohm et al. |
| 6,016,892 A | 1/2000 | Berwanger |

OTHER PUBLICATIONS

Extrema Products, Inc., "Terfenol–D", pp. 1–5.

Dr. Allison Flatau, "Welcome to Magnetostrictive Tranducers, Actuators, and Sensors @ Iowa State University . . . ", pp. 1–5.

Meritor Drawings K31001334/5–1, K31001334/3–1 and K31001334/1–1.

* cited by examiner

BRAKE ADJUSTER

BACKGROUND OF THE INVENTION

This invention relates to a brake adjuster for a heavy duty vehicle brake, and more particularly, the invention relates to a brake adjuster especially adapted for use with the pistons commonly found in heavy duty vehicle brakes.

Disc brake assemblies typically include a disc brake caliper that houses a piston for forcing a pair of friction elements or brake pads into engagement with a rotor. As the brake pads wear, the piston must move further to force the brake pads into engagement with the rotor. Accordingly, it is desirable to incorporate a wear adjustment mechanism to take up any clearance in the brake assembly as the brake pads wear. If a brake adjustment mechanism is not used, the vehicle operator will undesirably be required to push the brake pedal an additional amount to compensate for the wear in the brake pads and may also need to provide a greater force at the brake pedal.

Passenger vehicles typically use hydraulic brake cylinders that actuate a single hydraulic piston at each brake caliper. Because passenger vehicles have a relatively low vehicle weight the brake assemblies and brake adjustment mechanisms are relatively simple. Heavy duty vehicle brake assemblies commonly include multiple pistons that are actuated by a cam that is manipulated by a pneumatic actuator. The heavy duty brake assemblies are relatively complicated compared to passenger vehicle brake assemblies. Heavy duty brake assemblies have typically incorporated mechanical brake adjusters to adjust the pistons as the brake pads wear. Prior art non-mechanical brake adjusters are unsuitable for heavy duty vehicle brake applications. Therefore, it is desirable to develop a non-mechanical brake adjuster suitable for the pistons commonly used in heavy duty vehicle brakes.

SUMMARY OF THE INVENTION AND ADVANTAGES

The present invention provides a brake adjuster for a vehicle brake such as for heavy duty vehicle. The brake adjuster includes a brake module that produces an electrical signal for adjusting the vehicle brake. The heavy duty vehicle brake typically includes a pair of pistons each having first and second portions that are movable relative to one another. A friction element or brake pad is arranged proximate to the second portion and is movable from a desired position to a worn position as the brake pads wear during operation of the vehicle. In one embodiment of the present invention, the first and second portions are slip fit within a sleeve assembly. At least one adjustment member is arranged between the first and second portions. The adjustment member is constructed from a material which expands in response to an electrical signal, such as a magnetostrictive or a piezoelectric material. The adjustment member moves the second portion relative to the first portion and repositions the brake pads from the worn position to the desired position.

In another embodiment of the present invention, the first and second portions are threaded to one another and movable rotationally relative to one another to adjust the length of the piston. The first portions of the pistons include a plurality of teeth about the outer face. A gear is arranged between the pistons and coupled the teeth of the first portions together. An electric actuator has a driven member that is coupled with at least a portion of one of the pistons teeth to rotate the first and second portions relative to one another to increase the length of the piston. In this manner, the electric actuator moves the brake pad from the worn position to the desired position.

Accordingly, the above embodiments of the present invention provide a brake adjuster suitable for the pistons commonly used in heavy duty vehicle brakes

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
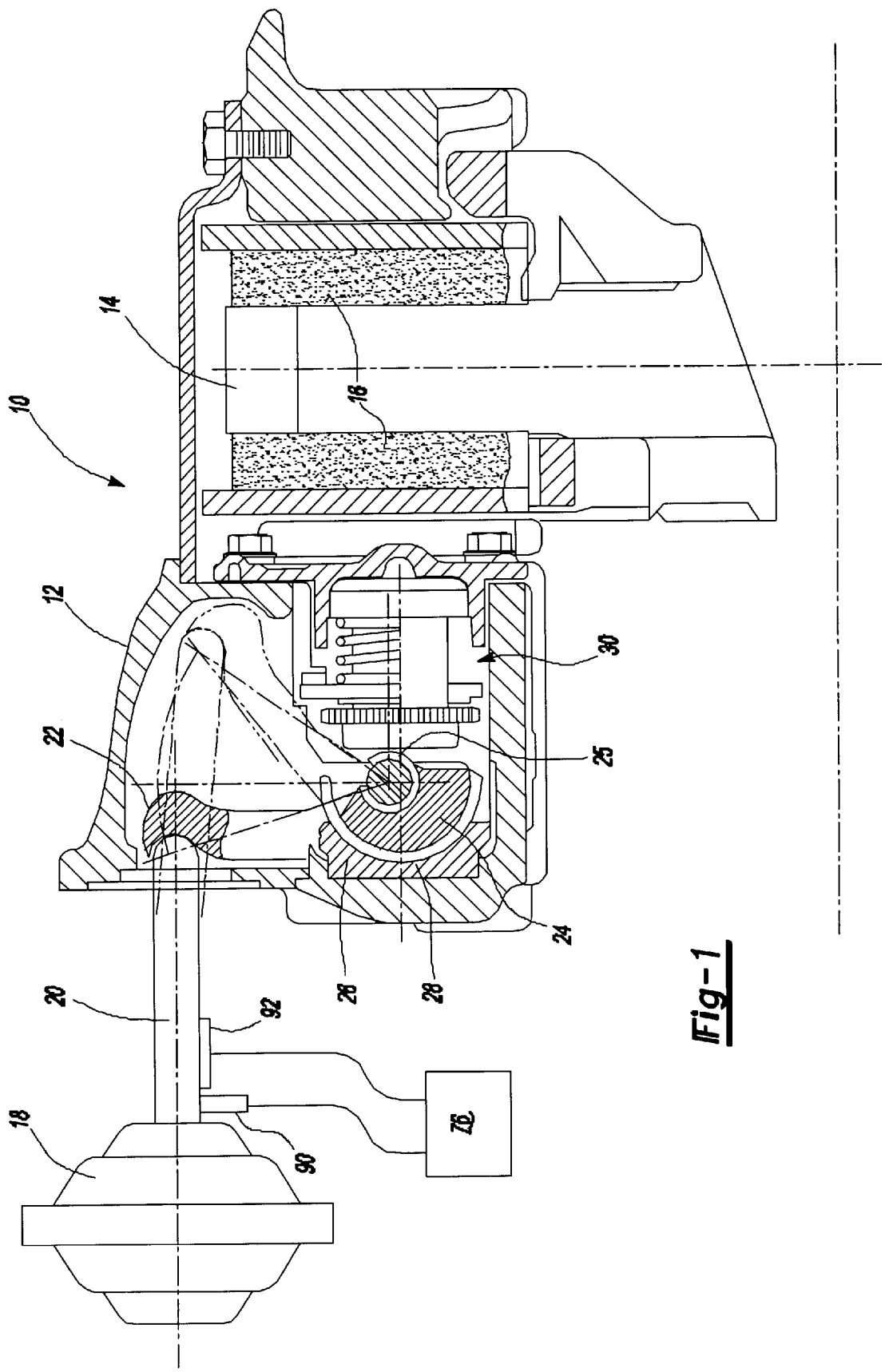
FIG. 1 is a cross-sectional end view of a vehicle brake assembly of the present invention.

A vehicle brake 10 is shown in FIG. 1. The vehicle brake 10 includes a housing 12 that may be constructed from one or more portions. A rotor 14 is arranged near or within a portion of the housing and has brake pads 16, or friction elements, arranged on either side of the arcuate outer surfaces of the rotor 14. A pneumatic actuator 18, typically an air chamber, actuates a brake mechanism 30 to force the brake pads 16 into engagement with the rotor 14. The actuator 18 moves a push rod 20 to rotate a lever 22 about a pivot point. The lever 22 includes a cam 24 having a profile 25 that cooperates with the brake mechanism 30 to move the brake pads 16. The cam 24 is received by a bearing block 26 and a plurality of needle bearings 28 in the housing 12.

Figure 2:
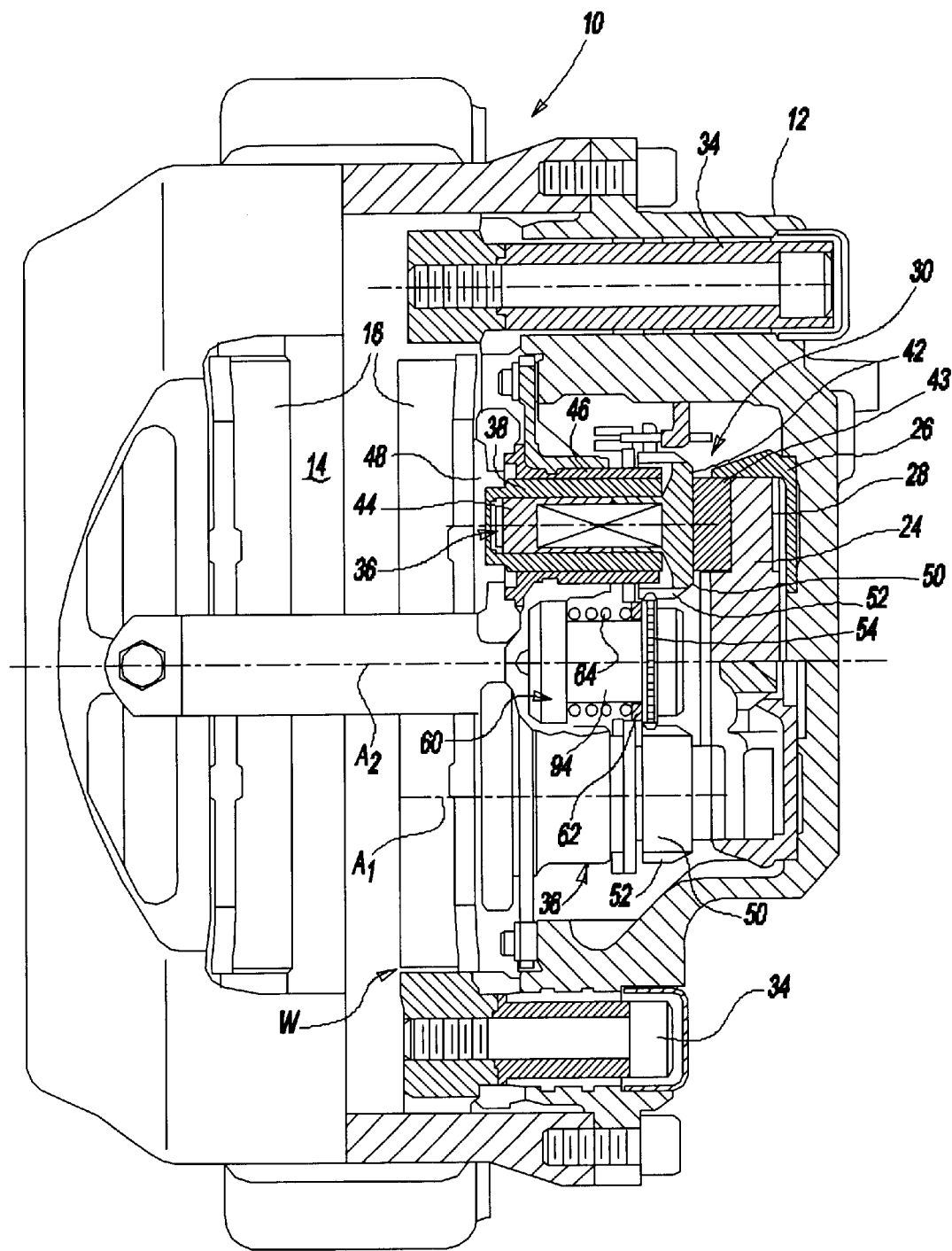
FIG. 2 is a cross-sectional top elevational view of one embodiment of the present invention.

As is known in the art, the housing 12 is supported on a mounting member by guide pins 34 to permit the housing 12 to move relative to the rotor 14 as the brake pads 16 wear. Heavy duty vehicle brake assemblies typically include a pair of pistons 36 that transmit the force generated by the actuator 18 through the push rod 20 and lever 22 to the brake pads 16. However, it is to be understood that any suitable number of pistons 36 may be used. The pistons 36 are not simply one piece, stamped cup-shaped members like those used for passenger cars, but rather the pistons 36 are relatively complex and include first 42 and second 44 portions that are moveable relative to one another. The movable portions 42, 44 enable the length of the pistons 36 to be adjusted as the brake pads 16 wear. For the embodiments shown in FIG. 2, the pistons 36 are received in the housing 12 by a sleeve assembly 38 that is received in a bearing 46 that is secured to the housing 12. A plate 48 is mounted to an end of the sleeve assembly 38 to which a brake pad 16 is attached. The sleeve 38 is received in the bearing 46 in a slip fit relation so that the sleeve 38 slides within the bearing 46 as the brakes are actuated.

The first portions 42 of the pistons 36 each include an outer surface 50 with a plurality of teeth 52 extending radially outwardly. A gear 54 is arranged between the pistons 36 to couple the pistons together. That is, as the first portion 42 of one piston 46 rotates the gear 54 will transmit the rotation to the first portion 42 of the other piston 36. Blocks 33 are arranged between the first portion 42 and the profile 25 of the cam 24 so that the first portion 42 may more freely rotate relative to the cam 24 during actuation of the brakes.

After the brakes are actuated, the brake pads 16 must be retracted to prevent the brake pads 16 from dragging on the rotor 14. To this end, a return assembly 60 is used to retract the pistons 36. The return assembly 60 includes a plate 62 adjacent to the plurality of teeth 52. A return spring 64 is arranged between a portion of the housing 12 and the plate 62. The return spring 64 applies a force opposite the actuation force to the plate 62 and into the first portions 42 of the pistons 36.

Previously, a mechanical brake adjustment device was used to rotate the first portions 42 of the pistons 36 in response to a cam mounted pin. The present invention, in one embodiment, utilizes an adjustment member 68 arranged in a cavity defined by the first 42 and second 44 portions. Due to friction and other forces within the brake assembly, a force of 500 N is typically required to adjust the first 42 and second 44 portions relative to one another. Moreover, each of the pistons is subjected to a compressive force of approximately 150 kN during actuation of the brakes. Accordingly, it is preferable for the adjustment member 68 to provide an adjustment force of approximately 500 N in addition to being capable of withstanding a compressive force of approximately 150 kN. In one preferred embodiment the adjustment member 68 is a magnetostrictive actuator. Such magnetostrictive actuators are available from such companies as Etrema Products, Inc. The magnetostrictive actuators include a magnetostrictive rod 72 adjacent to a magnetic coil 74. The magnetostrictive material of the rod 72 expands in response to a magnetic field generated in the magnetic coil 74. Additionally, magnetostrictive actuators have the benefit of providing a feedback signal as the load on the magnetostrictive rod 72 changes by causing a change in the magnetic field produced by the magnetic coil 74.

In operation, upon actuation of the brake pedal by the vehicle operator, an electrical signal is produced by a control module 76 to energize the magnetic coil 74 and produce a magnetic field to expand the magnetoelectric rod 72 to move first 42 and second 44 portions away from one another. In this manner, the adjustment member 68 moves the worn brake pad 16 from a worn position W to a desired position P to take up undesirable clearance between the brake pads 16 and the rotor 14. Undesirable clearance between the brake pad 16 and the rotor 14 necessitates a longer brake pedal stroke by the operator and potentially a greater input force by the operator to produce the same brake clamping force for brake pads 16 that are in a desired position. The adjustment member 68 also has the additional benefit of obviating the need for any load or stroke sensors thereby simplifying the operation of the brake adjuster.

Figure 3A:
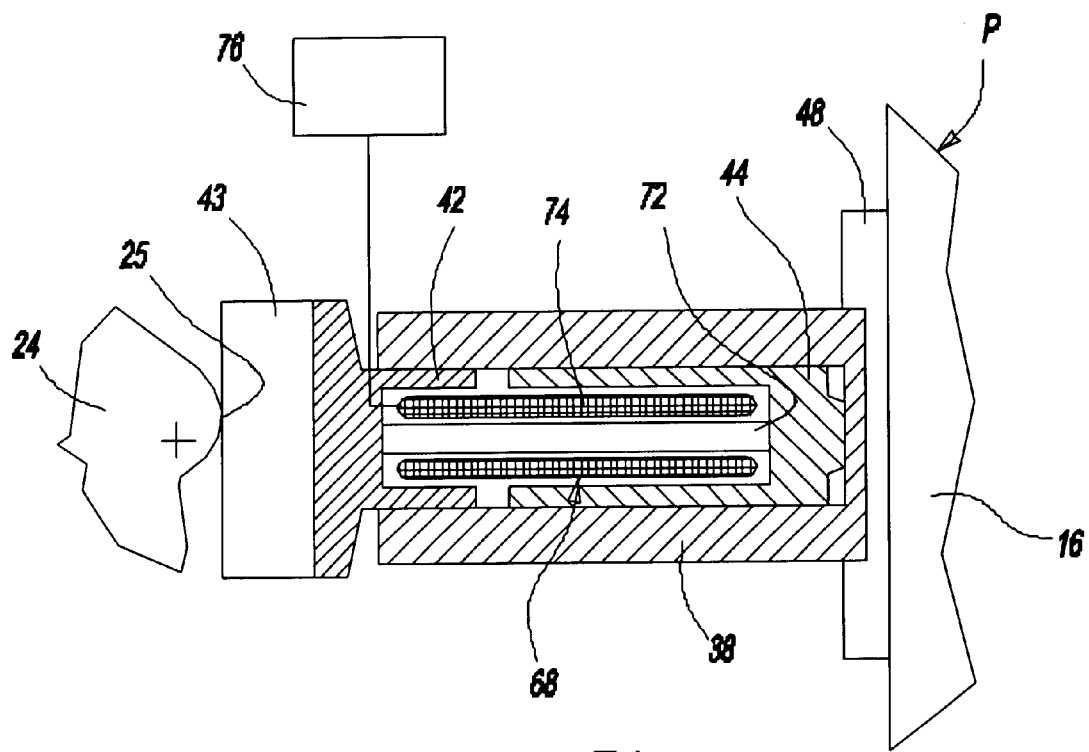
FIG. 3A is a first adjustment member for use with the brake assembly of FIG. 2.
Figure 3B:
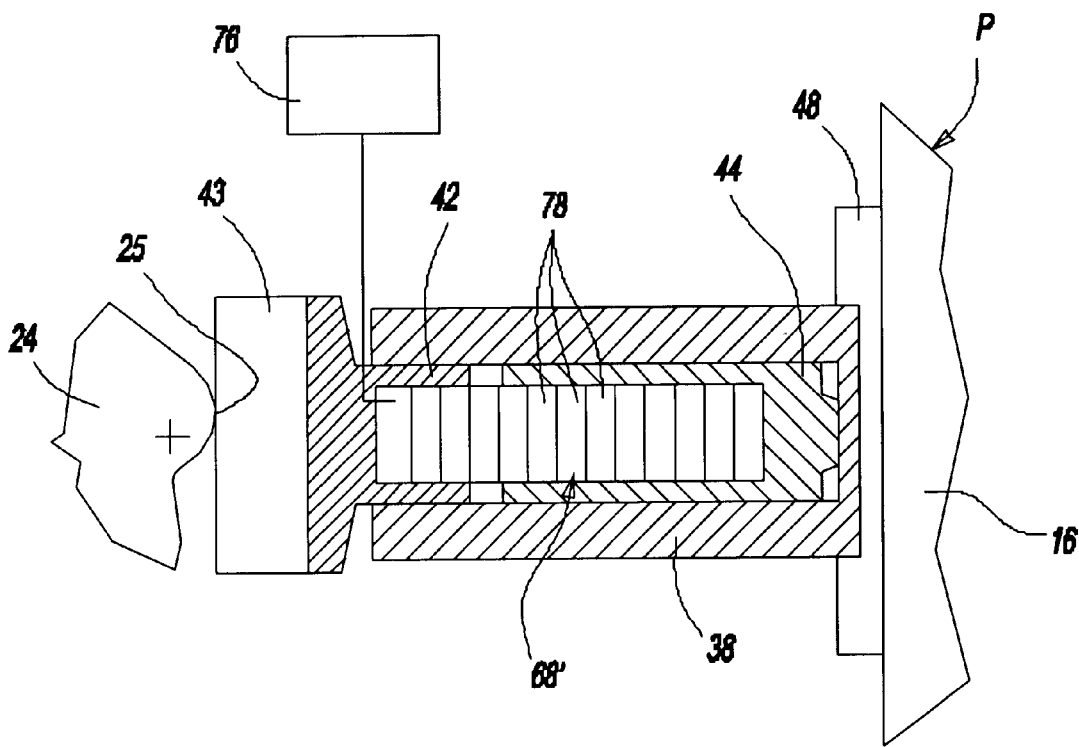
FIG. 3B is a second adjustment member for use with the brake assembly of FIG. 2.

In a second embodiment, shown in FIG. 3A, the adjustment member 68' may include one or more piezoelectric elements or discs arranged in the cavity defined by the first 42 and second 44 portions. Similar to the magnetostrictive material described above, the piezoelectric elements 78 expand in response to an electrical signal received by the adjustment 68' generated from the control module 76.

Figure 4:
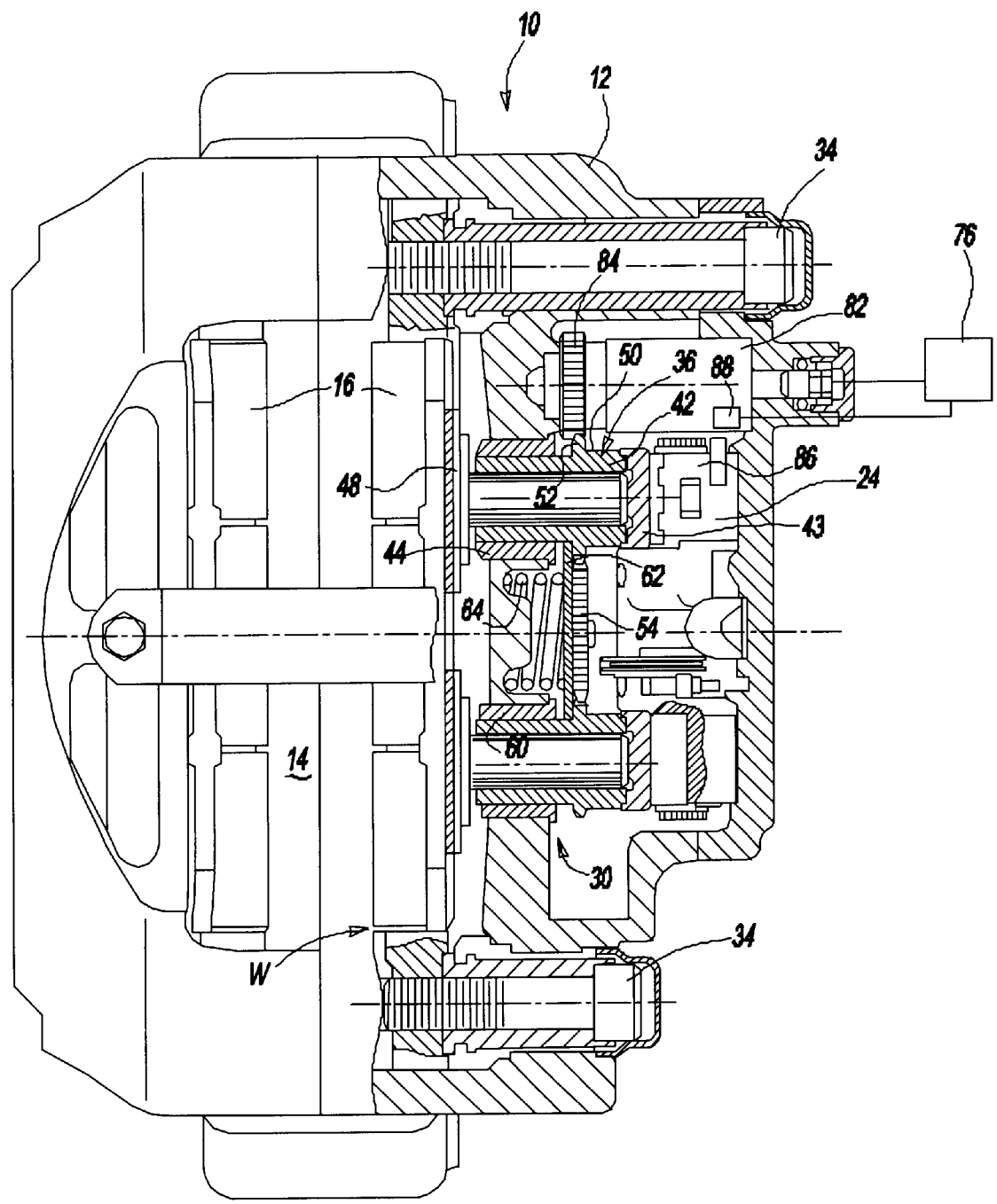
FIG. 4 is a cross-sectional top elevational view of another brake adjuster of the present invention.
Figure 5:
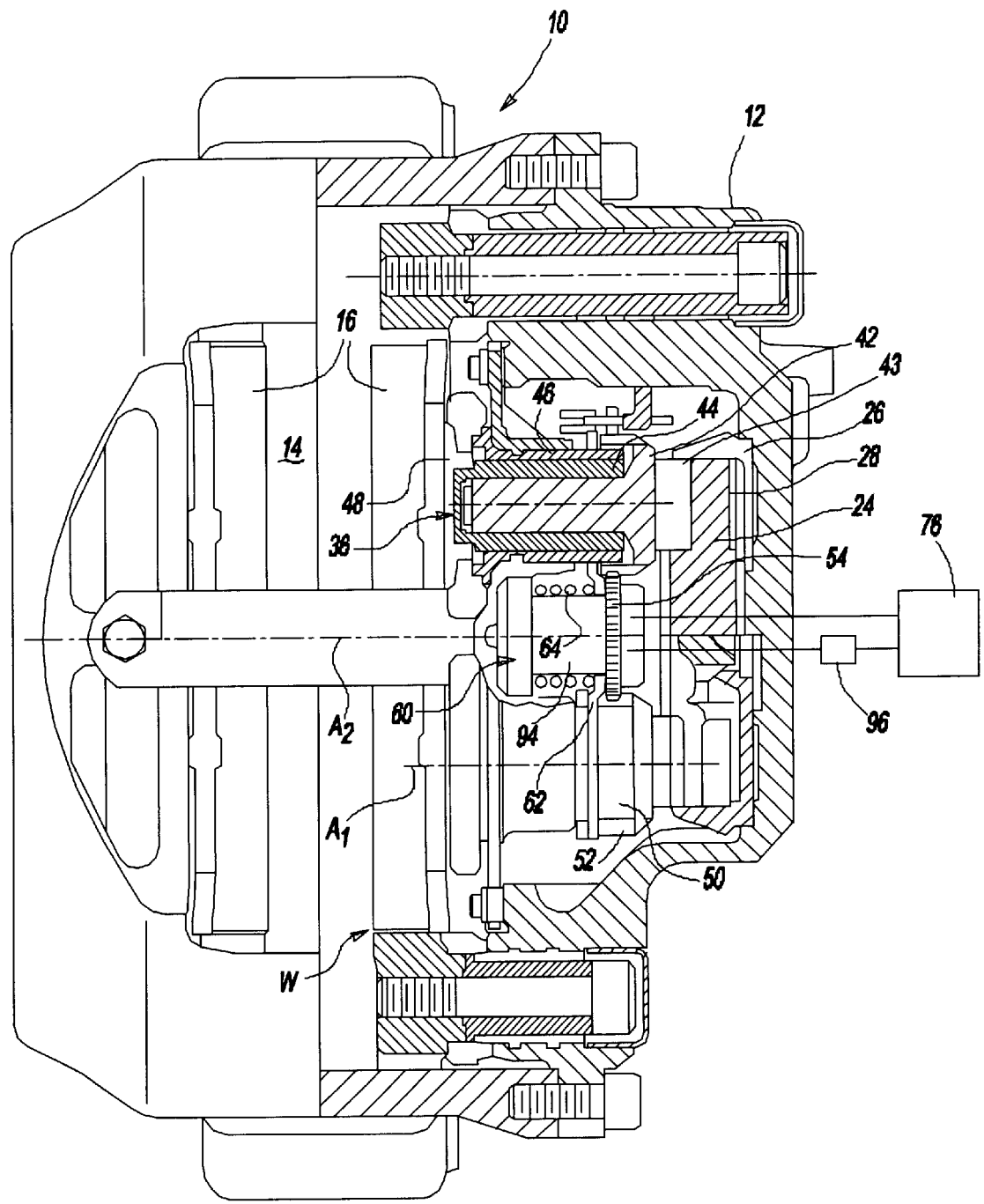
FIG. 5 is a cross-sectional top elevational view of yet another brake adjuster of the present invention.

A second embodiment of the brake adjusters in the present invention are shown in FIGS. 4 and 5. Referring to FIG. 4, an electrical actuator 82 is received in the housing 12. The electric actuator 82 includes a drive member 84 including a plurality of teeth. The teeth of the drive member 84 mesh with the plurality of teeth 52 on one of the first portions 42 on a piston 36. When the control module 76 produces an electrical signal to actuate the electric actuator 82, the drive member 84 rotatingly drives one of the first portions 42 of a piston 36 and drives the other first portion 42 of the other piston 36 through gear 64. In this manner, the pistons 36 may be lengthened or shortened.

The electric actuator 82 may be actuated in response to any number of inputs. For example, the electric actuator 82 may be actuated in response to a pin 86 extending from cam 24, which has been used for the prior art mechanical brake adjusters. As the brake pads wear, the cam must rotate about its pivot an increased amount to move the brake pad 16 the increased distance to rotor 14. As a result, it may be desirable to include a sensor 88 adjacent to the pin 86 to sense the location of the pin. When the pin 86 reaches a point indicative of the brake pads 16 being in a worn position W the control module 76 may produce an electrical signal to actuate the electric actuator 82 to take up the undesired clearance between the brake pads 16 and the rotor 14. However, it is to be understood that the brake adjusters of the present invention may be actuated at any time and controlled in any suitable manner.

For example, the vehicle brake assembly may include a stroke sensor 90 and a load sensor 92. The stroke sensor 90 and load sensor 92 may be arranged along any suitable component at the brake assembly 10 to measure movement of the brake components that move the piston 36 and the braking force generated within the brake assembly 10. The sensors 90 and 92 are connected to the control module 76. When the brake pads 16 are in a desired position P during the application of the brakes, a particular brake clamping load will be generated at a particular brake stroke position. Accordingly, the brake adjuster may be actuated when a lower brake clamping load is detected by the load sensor 92 at the particular stroke position. The lower brake clamping load is indicative of worm brake pads 16.

Referring to FIG. 5, the electric actuator 94 may be arranged between the pistons 36 and coaxial with the return assembly 60 to conserve space. The drive member of the electric actuator 94 may be the gear 54. Unlike the embodiment shown in FIG. 4, the first portions 42 of the pistons 36 are both directly driven by the electric actuator 94. An additional feature of the present invention may include a rotational position sensor 96 for detecting the number of rotations of the electric actuator 94 so that it may be determined how much the brake pads 16 have been adjusted to compensate for wear. This information may be used in conjunction with other brake or vehicle control systems to provide better control and maintenance of the vehicle.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A brake adjuster for a vehicle brake comprising:
   a control module producing an electrical signal for adjusting the vehicle brake;
   a piston having first and second portions movable relative to one another;

a friction element proximate to said second portion and movable between a worn position and a desired position; and at least one adjustment member interposed between said first and second portions, said adjustment member constructed from a material which expands in response to said electrical signal to move said second portion relative to said first portion and reposition said friction element from said worn position to said desired position.

2. The brake adjuster according to claim 1, further including a sleeve assembly with said piston disposed therein, said sleeve assembly interposed between said friction element and said second portion.

3. A brake adjuster for a vehicle brake comprising:

a control module producing an electrical signal for adjusting the vehicle brake;

a piston having first and second portions movable relative to one another;

a friction element proximate to said second portion and movable between a worn position and a desired position;

at least one adjustment member interposed between said first and second portions, said adjustment member constructed from a material which expands in response to said electrical signal to move said second portion relative to said first portion and reposition said friction element from said worn position to said desired position; and a block adjacent to said first portion and a cam adjacent to said block, said cam applying a braking force to said piston and said friction element.

4. The brake adjuster according to claim 1, wherein said adjustment member comprises a magnetostrictive rod, and further including a magnetic coil proximate to said adjustment member for creating a magnetic field in response to said electrical signal.

5. The brake adjuster according to claim 4, wherein said magnetostrictive material is Terfanol-D.

6. A brake adjuster for a vehicle brake comprising:

a control module producing an electrical signal for adjusting the vehicle brake;

a piston having first and second portions movable relative to one another;

a friction element proximate to said second portion and movable between a worn position and a desired position; and at least one adjustment member interposed between said first and second portions, said adjustment member constructed from a material which expands in response to said electrical signal to move said second portion relative to said first portion and reposition said friction element from said worn position to said desired position, wherein said adjustment member produces a feedback signal in response to achieving a predetermined adjustment load.

7. The brake adjuster according to claim 1, wherein said adjustment member comprises a piezoelectric disc excitable in response to said electrical signal.

8. A brake adjuster for a vehicle brake comprising:

a control module producing an electrical signal for adjusting the vehicle brake;

spaced apart pistons each having first and second portions threaded to one another with each of said first and second portions movable rotationally relative to one another to adjust a length of each of said pistons, said first portion including a plurality of teeth about an outer surface;

a gear interposed between said pistons coupling said teeth of said first portions;

a friction element proximate to said second portions and movable between a worn position and a desired position; and an electric actuator driving said plurality of teeth on at least one of said first portions in response to said electrical signal to move said each first and second portions rotationally relative to one another and reposition said friction element from said worn position to said desired position.

9. The brake adjuster according to claim 8, further including a return assembly for retracting said pistons to a retracted position along an axis, and said return assembly aligned with said gear.

10. The brake adjuster according to claim 9, wherein said electric actuator is coaxial with said return assembly, and said electric actuator rotationally driving said gear about said axis for rotating said first portions relative to said second portions.

11. The brake adjuster according to claim 8, wherein said electric actuator includes a drive member coupled to said plurality of teeth on at least one of first portions with said plurality of teeth on at least one of first portions interposed between said gear and said drive member.

12. The brake adjuster according to claim 8, wherein said electric adjuster rotates said first portion relative to said second portion until a stall torque is achieved.

13. A brake adjuster for a vehicle brake comprising:

a control module producing an electrical signal for adjusting the vehicle brake;

spaced apart pistons each having first and second portions threaded to one another and movable rotationally relative to one another to adjust a length of each of said pistons, said first portion including a plurality of teeth about an outer surface;

a gear interposed between said pistons coupling said teeth of said first portions;

a friction element proximate to said second portions and movable between a worn position and a desired position;

an electric actuator driving said plurality of teeth on at least one of said first portions in response to said electrical signal to move said each first and second portions rotationally relative to one another and reposition said friction element from said worn position to said desired position; and a block proximate to said first portion and a cam adjacent to said block, said cam applying a braking force to said piston and said friction element.

14. The brake adjuster according to claim 13, wherein said cam includes a pin extending therefrom movable with said cam during application of said braking force, and further including a sensor adjacent to said pin for sensing an adjustment position of said pin corresponding to said wear position of said friction element, and said control module producing said electrical signal in response to pin reaching said adjustment position.

15. The brake adjuster according to claim 13, wherein said control module produces said electrical signal at an initial actuation of said cam prior to applying said braking force.

16. The brake adjuster according to claim 13, further including a pushrod connected to said cam for providing said braking force, a stroke sensor for determining an actuation distance of said pushrod, and a load sensor for determining said braking force, said control module producing said electrical signal in response to said actuation distance reaching a predetermined value at a predetermined braking force.

17. The brake adjuster according to claim 16, wherein said stroke sensor is proximate to said pushrod for determining an actual actuation distance of said pushrod.

18. A brake adjuster for a vehicle brake comprising:

a control module producing an electrical signal for adjusting the vehicle brake;

spaced apart pistons each having first and second portions threaded to one another and movable rotationally relative to one another to adjust a length of each of said pistons, said first portion including a plurality of teeth about an outer surface;

a gear interposed between said pistons coupling said teeth of said first portions;

a friction element proximate to said second portions and movable between a worn position and a desired position; and an electric actuator driving said plurality of teeth on at least one of said first portions in response to said electrical signal to move said each first and second portions rotationally relative to one another and reposition said friction element from said worn position to said desired position, wherein said electric actuator includes a rotational position sensor for determining an amount of wear adjustment and sending a wear signal to said control module.

19. The brake adjuster according to claim 8, wherein said pistons move axially from said worn position to said desired position in response to said electrical signal.

* * * * *